US012720256B2

(12) United States Patent
Noguchi et al.

(10) Patent No.: US 12,720,256 B2
(45) Date of Patent: Aug. 25, 2026

(54) UTTERANCE FEEDBACK APPARATUS, UTTERANCE FEEDBACK METHOD, AND PROGRAM

(71) Applicant: NTT, Inc.

(72) Inventors: Kenichi Noguchi, Tokyo (JP); Kazunori Kobayashi, Tokyo (JP); Hiroaki Ito, Tokyo (JP)

(73) Assignee: NTT, Inc., Tokyo (JP)

( * ) Notice: Subject to any disclaimer, the term of this patent is extended or adjusted under 35 U.S.C. 154(b) by 140 days.

(21) Appl. No.: 18/293,991

(22) PCT Filed: Aug. 6, 2021

(86) PCT No.: PCT/JP2021/029278
§ 371 (c)(1),
(2) Date: Jan. 31, 2024

(87) PCT Pub. No.: WO2023/013019
PCT Pub. Date: Feb. 9, 2023

(65) Prior Publication Data
US 2025/0080905 A1 Mar. 6, 2025

(51) Int. Cl.
*H04R 3/00* (2006.01)

(52) U.S. Cl.
CPC ......... *H04R 3/005* (2013.01); *H04R 2410/05* (2013.01)

(58) Field of Classification Search
CPC ............................ H04R 3/005; H04R 2410/05
USPC .................................... 381/95, 96, 108, 318
See application file for complete search history.

(56) References Cited

U.S. PATENT DOCUMENTS

| | | | | |
|---|---|---|---|---|
| 8,588,444 B2 * | 11/2013 | Pape | H04R 25/453 | 381/313 |
| 9,832,574 B2 * | 11/2017 | Rosenkranz | H04R 25/453 | |
| 2002/0176594 A1 * | 11/2002 | Hohmann | H04R 25/552 | 381/318 |
| 2011/0206226 A1 * | 8/2011 | Pandey | H04R 25/453 | 381/317 |
| 2016/0080875 A1 * | 3/2016 | Rosenkranz | H04R 25/453 | 381/318 |

FOREIGN PATENT DOCUMENTS

| | | |
|---|---|---|
| JP | 2009267799 A | 11/2009 |
| JP | 2021022883 A | 2/2021 |

* cited by examiner

*Primary Examiner* — William A Jerez Lora

(57) ABSTRACT

Provided is a technique for providing feedback on the degree of utterance volume to an utterer. The utterance feedback device includes: an utterance volume evaluation unit that generates an evaluation value for a volume of an utterance voice (referred to as utterance volume evaluation value, hereinafter) from a first sound collection signal that is output by a first microphone installed near an utterer to collect an utterance voice, which is a voice of the utterer, and a second sound collection signal that is output by a second microphone installed at a position farther away from the utterer than the first microphone to collect the utterance voice; and a feedback sound signal generation unit that generates a signal for emitting, from a speaker, a feedback sound indicating the degree of the volume of the utterance voice to the utterer (hereinafter referred to as a feedback sound signal), from the first sound collection signal, by using a feedback gain corresponding to the utterance volume evaluation value.

6 Claims, 15 Drawing Sheets

UTTERANCE FEEDBACK APPARATUS, UTTERANCE FEEDBACK METHOD, AND PROGRAM

CROSS-REFERENCE TO RELATED APPLICATIONS

This application is a U.S. 371 Application of International Patent Application No. PCT/JP2021/029278, filed on 6 Aug. 2021, the disclosure of which is hereby incorporated herein by reference in its entirety.

TECHNICAL FIELD

The present invention relates to an acoustic signal processing technique for preventing the voice of an utterer from becoming a nuisance to those around him/her.

BACKGROUND ART

As an acoustic signal processing technique for preventing the voice of an utterer from becoming a nuisance to those around him/her, there is a technique described in PTL 1. According to the technique described in PTL 1, a disturbing sound (hereinafter referred to as a masking sound) for masking the voice of a far-end utterer reproduced from a speaker so as not to be heard by surrounding people is used to prevent said voice from leaking to the surroundings, and to prevent the masking sound from becoming excessive and becoming a nuisance to those around him/her.

CITATION LIST

Patent Literature

[PTL 1] Japanese Patent Application Publication No. 2009-267799

SUMMARY OF INVENTION

Technical Problem

The technique disclosed in PTL 1 is to reproduce the masking sound so that people in the vicinity cannot hear what is being said. Therefore, the utterer is unable to ascertain at what volume he/she should speak so that the surrounding people cannot hear the utterance content.

Thus, an object of the present invention is to provide a technique for providing feedback to an utterer on the degree of utterance volume.

Solution to Problem

One aspect of the present invention includes: an utterance volume evaluation unit that generates an evaluation value for a volume of an utterance voice (referred to as utterance volume evaluation value, hereinafter) from a first sound collection signal that is output by a first microphone installed near an utterer to collect an utterance voice, which is a voice of the utterer, and a second sound collection signal that is output by a second microphone installed at a position farther away from the utterer than the first microphone to collect the utterance voice; and a feedback sound signal generation unit that generates a signal for emitting, from a speaker, a feedback sound indicating the degree of a volume of the utterance voice to the utterer (hereinafter referred to as a feedback sound signal), from the first sound collection signal, by using a feedback gain corresponding to the utterance volume evaluation value.

Advantageous Effects of Invention

According to the present invention, it is possible to provide feedback to the utterer on the degree of utterance volume.

DESCRIPTION OF EMBODIMENTS

Embodiments of the present invention will be described hereinafter in detail. Note that components having the same function are denoted by the same numbers, and redundant description thereof will be omitted.

Prior to the description of each embodiment, the notation in this specification will be explained.

^(Caret) denotes superscript. For example, $x^{y\hat{}z}$ means that $y^z$ is a superscript to x and $x_{y\hat{}z}$ means that $y_z$ is a subscript to x. _(Underscore) denotes subscript. For example, $x^{y\_z}$ means that $y_z$ is a superscript to x and $x_{y\_z}$ means that $y_z$ is a subscript to x.

Superscripts "^" and "~" as in ^x and ~x for a certain character x would normally be written directly above "x," but are written as ^x or ~x here due to restrictions on notation in this specification.

First Embodiment

Figure 1:
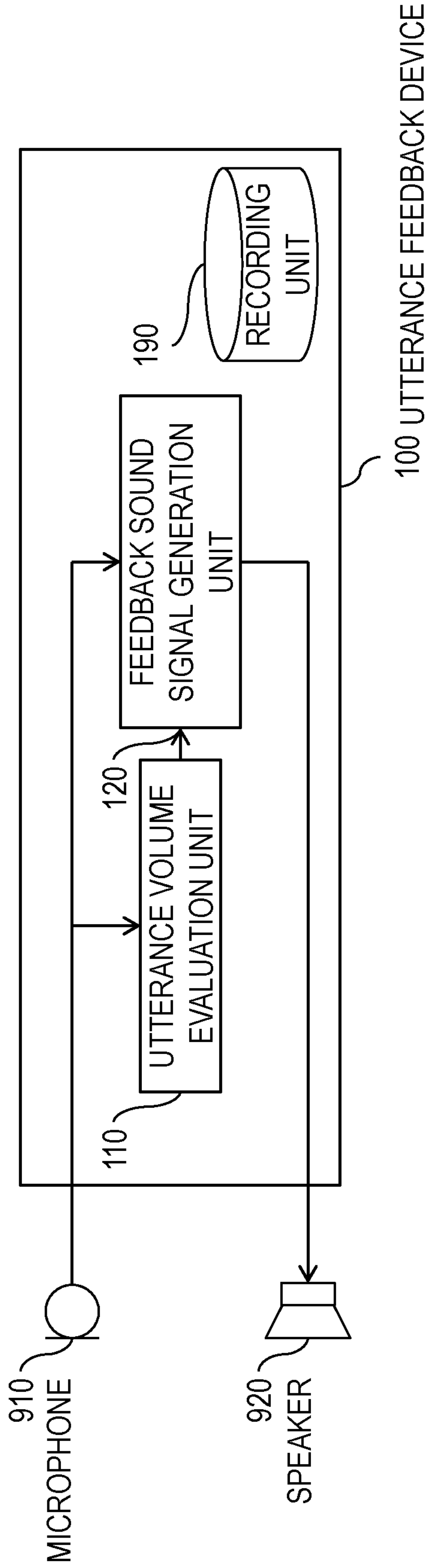
FIG. 1 is a block diagram showing a configuration of an utterance feedback device 100.
Figure 2:
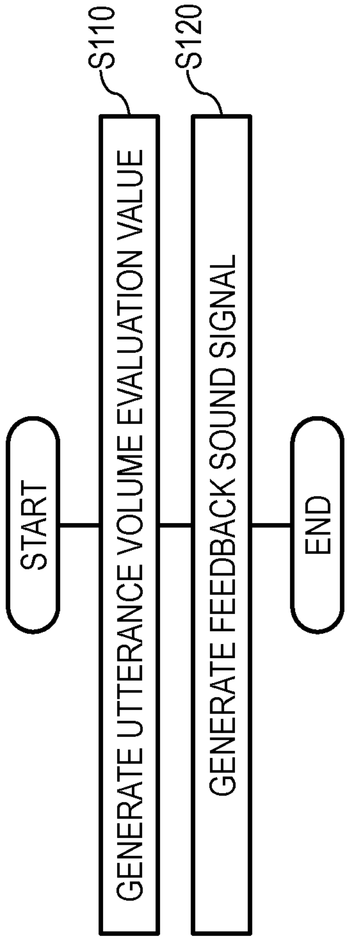
FIG. 2 is a flowchart showing an operation of the utterance feedback device 100.

An utterance feedback device 100 will be described below with reference to FIGS. 1 and 2. FIG. 1 is a block diagram showing a configuration of the utterance feedback device 100. FIG. 2 is a flowchart showing an operation of the utterance feedback device 100. As shown in FIG. 1, the utterance feedback device 100 includes an utterance volume evaluation unit 110, a feedback sound signal generation unit 120, and a recording unit 190. The recording unit 190 is a component for properly recording information necessary for the processing of the utterance feedback device 100. The utterance feedback device 100 is connected to a microphone 910 and a speaker 920. The microphone 910 is installed near an utterer in order to collect an utterance voice which is the voice of the utterer. The speaker 920 is installed to emit a feedback sound indicating the degree of the volume of an utterance voice to the utterer. Note that headphones or earphones may be used in place of the speaker 920.

An operation of the utterance feedback device 100 will be described with reference to FIG. 2.

In S110, the utterance volume evaluation unit 110 receives a sound collection signal output by the microphone 910 as an input, generates an evaluation value for the volume of an utterance voice (referred to as an utterance volume evaluation value, hereinafter) from the sound collection signal, and outputs the evaluation value. The utterance volume evaluation unit 110 generates the utterance volume evaluation value by, for example, comparing the power of the sound collection signal with a predetermined threshold. The utterance volume evaluation unit 110 may detect a voice section or suppress noise when calculating the power of the sound collection signal. The utterance volume evaluation value may be a value indicating that the utterance volume is large, a value indicating that the utterance volume is small, or the like.

In S120, the feedback sound signal generation unit 120 inputs the sound collection signal output by the microphone 910 and the utterance volume evaluation value generated in S110, and by using a feedback gain corresponding to the utterance volume evaluation value, generates a signal of a feedback sound emitted from the speaker 920 (hereinafter referred to as a feedback sound signal) from the sound collection signal, and outputs the feedback sound signal. It is known that the utterer utters while listening to a feedback sound generated from his/her own utterance voice, and when the feedback delay becomes 20 ms or more, the delay becomes nuisance, and when the feedback delay exceeds 50 ms, the feedback sound becomes a distraction, making the utterance difficult. Therefore, the feedback sound signal generation unit 120 may generate the feedback sound signal so that, for example, the time from utterance by the utterer to the time the utterer hears the feedback sound is within 20 ms.

Further, the feedback sound signal generation unit 120 may set the feedback gain to a larger value as the utterance volume evaluation value is larger. For example, if the utterance volume evaluation value is a value indicating that the utterance volume evaluation value is excessive, the feedback sound signal may be generated using a feedback gain that causes temporary distortion. In order to determine whether or not the utterance volume evaluation value is a value indicating that the utterance volume evaluation value is excessive, it is preferred to determine whether or not the utterance volume evaluation value exceeds a predetermined threshold.

Further, the feedback sound signal generation unit 120 may process the sound collection signal by using, for example, noise suppression processing, voice clarification processing, or spectrum processing for emphasizing a voice band, to make the feedback sound a sound that can be easily heard by the utterer. When active noise control (ANC) is used as noise suppression processing, the feedback sound signal generation unit 120 may increase the effect of the active noise control as the utterance volume evaluation value becomes larger.

According to the embodiment of the present invention, it is possible to provide feedback to the utterer on the degree of the utterance volume. Thus, the utterer can spontaneously adjust the utterance volume. Moreover, by using noise suppression processing when generating the feedback sound signal, it is possible to adjust the utterance volume in the form of applying the Lombard effect, that is, to suppress utterance in a large voice under noise.

Second Embodiment

Figure 3:
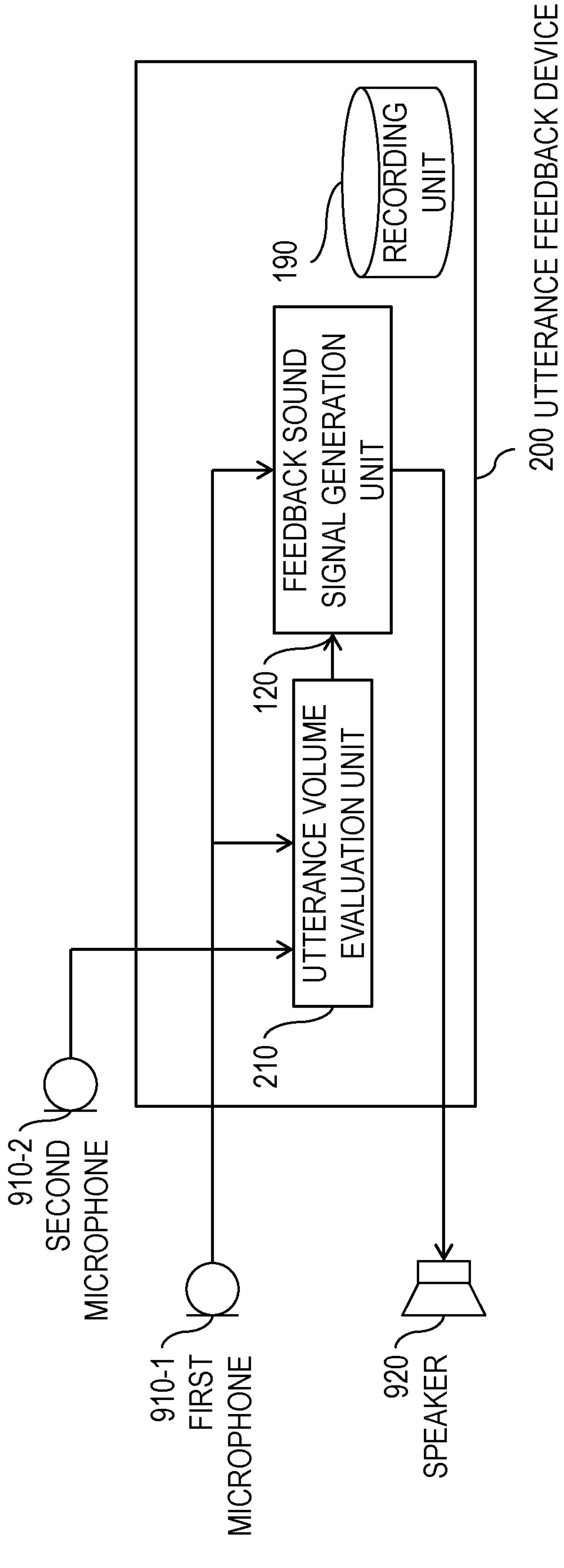
FIG. 3 is a block diagram showing a configuration of an utterance feedback device 200.
Figure 4:
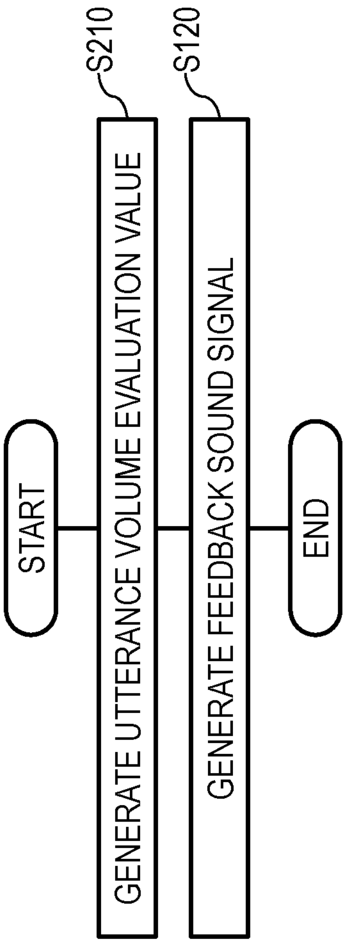
FIG. 4 is a flowchart showing an operation of the utterance feedback device 200.

An utterance feedback device 200 will be described below with reference to FIGS. 3 and 4. FIG. 3 is a block diagram showing a configuration of the utterance feedback device 200. FIG. 4 is a flowchart showing an operation of the utterance feedback device 200. As shown in FIG. 3, the utterance feedback device 200 includes an utterance volume evaluation unit 210, the feedback sound signal generation unit 120, and the recording unit 190. The recording unit 190 is a component for properly recording information necessary for the processing of the utterance feedback device 200. The utterance feedback device 200 is connected to a first microphone 910-1, a second microphone 910-2, and the speaker 920. The first microphone 910-1 is installed in the vicinity of the utterer in order to collect the utterance voice which is the utterance of the utterer. The second microphone 910-2 is installed at a position farther from away the utterer than the first microphone 910-1 in order to collect the utterance voice, and is installed to measure how loud the utterance of the utterer is heard by those around him/her. The speaker 920 is installed to emit a feedback sound indicating the degree of the volume of the utterance voice to the utterer. A partition may be installed between the first microphone 910-1 and the second microphone 910-2. Specifically, the first microphone 910-1 is installed on the same side as the utterer and the second microphone 910-2 is installed on the opposite side to the utterer, with the partition as a boundary. Headphones or earphones may be used in place of speaker 920. The utterance feedback device 200 is different from the utterance feedback device 100 in that the utterance feedback device 200 includes the utterance volume evaluation unit 210 instead of the utterance volume evaluation unit 110 and is connected to two microphones.

The operation of the utterance feedback device 200 will be described with reference to FIG. 4.

In S210, the utterance volume evaluation unit 210 inputs a first sound collection signal output by the first microphone 910-1 and a second sound collection signal output by the second microphone 910-2, generates an evaluation value for the volume of the utterance voice (hereinafter referred to as an utterance volume evaluation value) from the first sound collection signal and the second sound collection signal, and outputs the evaluation value. The utterance volume evaluation unit 210 generates the utterance volume evaluation value by, for example, comparing the power of the second sound collection signal with a predetermined threshold. The utterance volume evaluation unit 210 utilizes a voice section that is detected by using the first sound collection signal in order to eliminate the influence of noise when obtaining the power of the second sound collection signal. By generating the utterance volume evaluation value on the basis of the power of the second sound collection signal, the utterance volume evaluation unit 210 can generate the utterance volume evaluation value in consideration of the attenuation effect on the utterance voice by the partition when the partition is installed.

In S120, the feedback sound signal generation unit 120 inputs the first sound collection signal output by the first microphone 910-1 and the utterance volume evaluation value generated in S210, and by using a feedback gain corresponding to the utterance volume evaluation value, generates a signal of a feedback sound emitted from the speaker 920 (hereinafter referred to as a feedback sound signal) from the first sound collection signal, and outputs the feedback sound signal.

According to the embodiment of the present invention, it is possible to provide feedback to the utterer on the degree of the utterance volume. The utterance volume evaluation value can be generated more accurately by obtaining the power of the second sound collection signal by utilizing the voice section detected by using the first sound collection signal in which the utterance voice is mainly collected and surrounding noise is relatively small.

Third Embodiment

Figure 5:
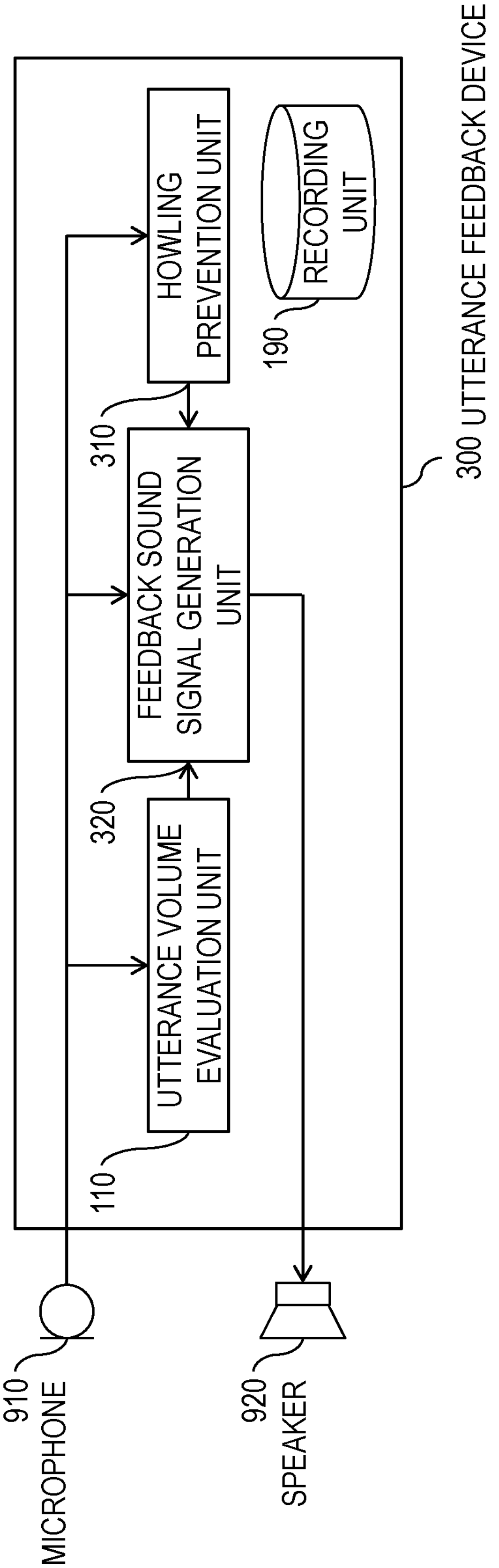
FIG. 5 is a block diagram showing a configuration of an utterance feedback device 300.
Figure 6:
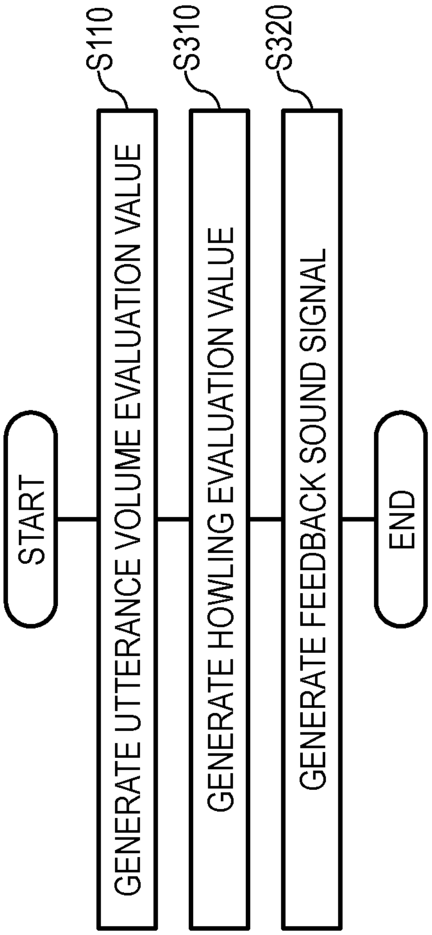
FIG. 6 is a flowchart showing an operation of the utterance feedback device 300.

An utterance feedback device 300 will be described below with reference to FIGS. 5 and 6. FIG. 5 is a block diagram showing a configuration of the utterance feedback device 300. FIG. 6 is a flowchart showing an operation of the utterance feedback device 300. As shown in FIG. 5, the utterance feedback device 300 includes the utterance volume evaluation unit 110, a howling prevention unit 310, a feedback sound signal generation unit 320, and the recording unit 190. The recording unit 190 is a component for properly recording information necessary for the processing of the utterance feedback device 300. The utterance feedback device 300 is connected to the microphone 910 and the speaker 920. The utterance feedback device 300 differs from the utterance feedback device 100 in that the utterance feedback device 300 includes the howling prevention unit 310 and includes the feedback sound signal generation unit 320 instead of the feedback sound signal generation unit 120.

The operation of the utterance feedback device 300 will be described with reference to FIG. 6. Here, only operations of the howling prevention unit 310 and the feedback sound signal generation unit 320 will be described.

In S310, the howling prevention unit 310 receives a sound collection signal output by a microphone 910 as an input, generates, from the sound collection signal, a howling evaluation value indicating the possibility of occurrence of howling when a feedback sound is emitted from the speaker, and outputs the howling evaluation value.

In S320, the feedback sound signal generation unit 320 inputs the sound collection signal output by the microphone 910, the utterance volume evaluation value generated in S110, and the howling evaluation value generated in S310, and by using a feedback gain corresponding to the utterance volume evaluation value and the howling evaluation value, generates a signal of a feedback sound emitted from the speaker 920 (hereinafter referred to as a feedback sound signal) from the sound collection signal, and outputs the feedback sound signal. The feedback sound signal generation unit 320 sets the feedback gain to a smaller value as the howling evaluation value is a value indicating that the howling evaluation value is larger.

(Modification 1)

The utterance feedback device may be connected to two microphones.

Figure 7:
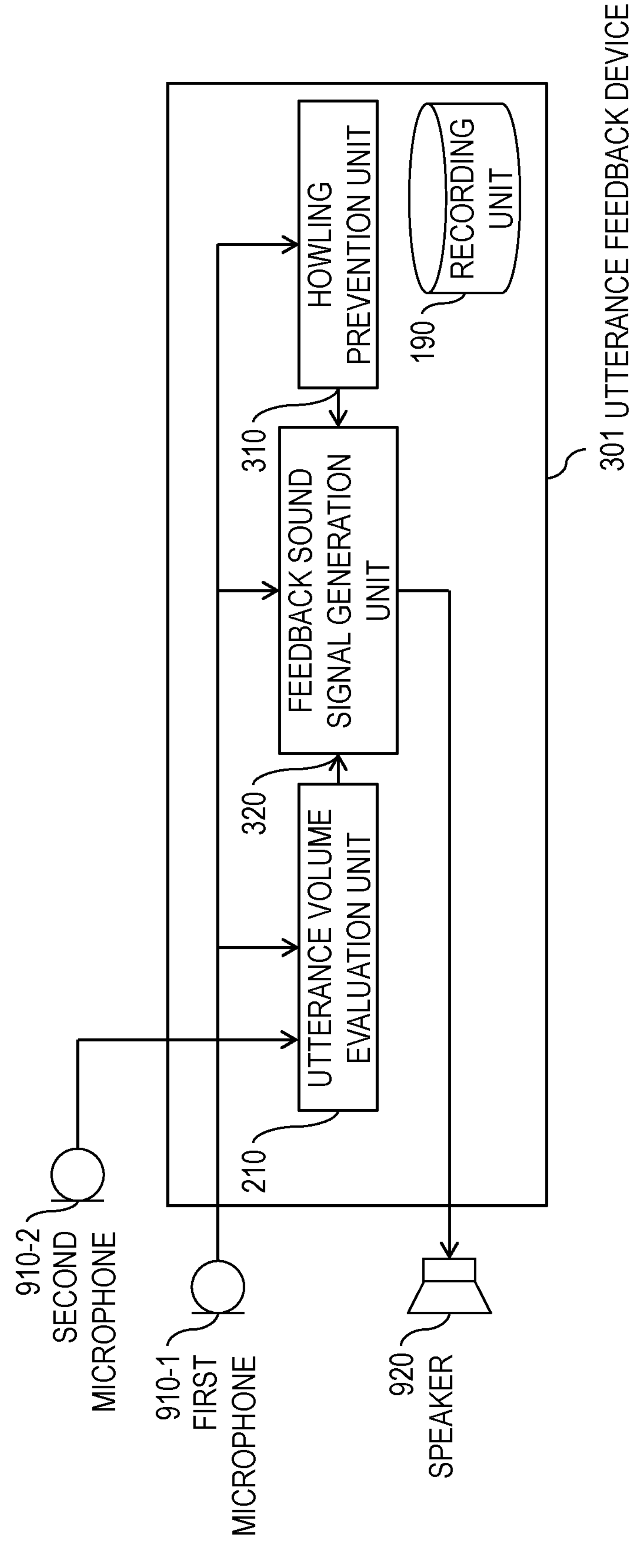
FIG. 7 is a block diagram showing a configuration of an utterance feedback device 301.
Figure 8:
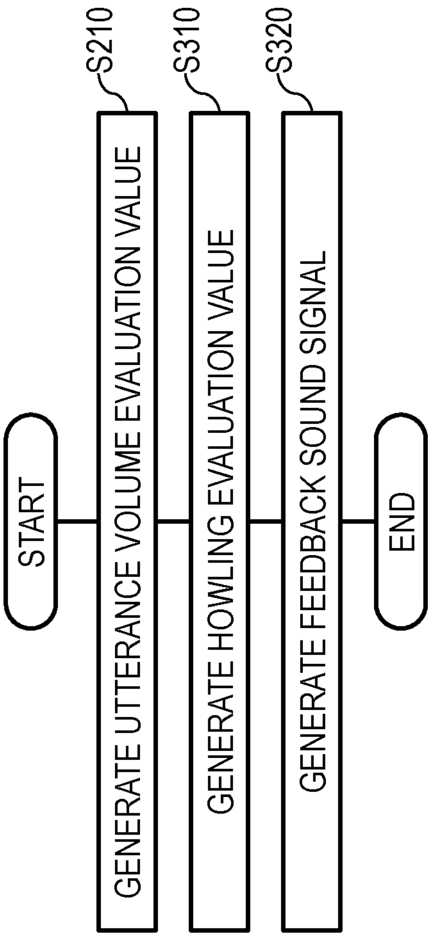
FIG. 8 is a flowchart showing an operation of the utterance feedback device 301.

An utterance feedback device 301 will be described below with reference to FIGS. 7 and 8. FIG. 7 is a block diagram showing a configuration of the utterance feedback device 301. FIG. 8 is a flowchart showing an operation of the utterance feedback device 301. As shown in FIG. 7, the utterance feedback device 301 includes the utterance volume evaluation unit 210, the howling prevention unit 310, the feedback sound signal generation unit 320, and the recording unit 190. The recording unit 190 is a component for properly recording information necessary for the processing of the utterance feedback device 301. The utterance feedback device 301 is connected to the first microphone 910-1, the second microphone 910-2, and the speaker 920. The utterance feedback device 301 is different from the utterance feedback device 300 in that the utterance feedback device 301 includes the utterance volume evaluation unit 210 instead of the utterance volume evaluation unit 110 and is connected to two microphones.

The operation of the utterance feedback device 301 will be described with reference to FIG. 8. Here, only operations of the howling prevention unit 310 and the feedback sound signal generation unit 320 will be described.

In S310, the howling prevention unit 310 receives the first sound collection signal output by the first microphone 910-1 as an input, generates, from the first sound collection signal, a howling evaluation value indicating the possibility of occurrence of howling when a feedback sound is emitted from the speaker, and outputs the howling evaluation value.

In S320, the feedback sound signal generation unit 320 inputs the first sound collection signal output by the first microphone 910-1, the utterance volume evaluation value generated in S110, and the howling evaluation value generated in S310, and by using a feedback gain corresponding to the utterance volume evaluation value and the howling evaluation value, generates a signal of a feedback sound emitted from the speaker 920 (hereinafter referred to as a feedback sound signal) from the first sound collection signal, and outputs the feedback sound signal.

(Modification 2)

The utterance feedback device may be connected to a microphone array and a speaker array instead of the microphone and the speaker.

Figure 9:
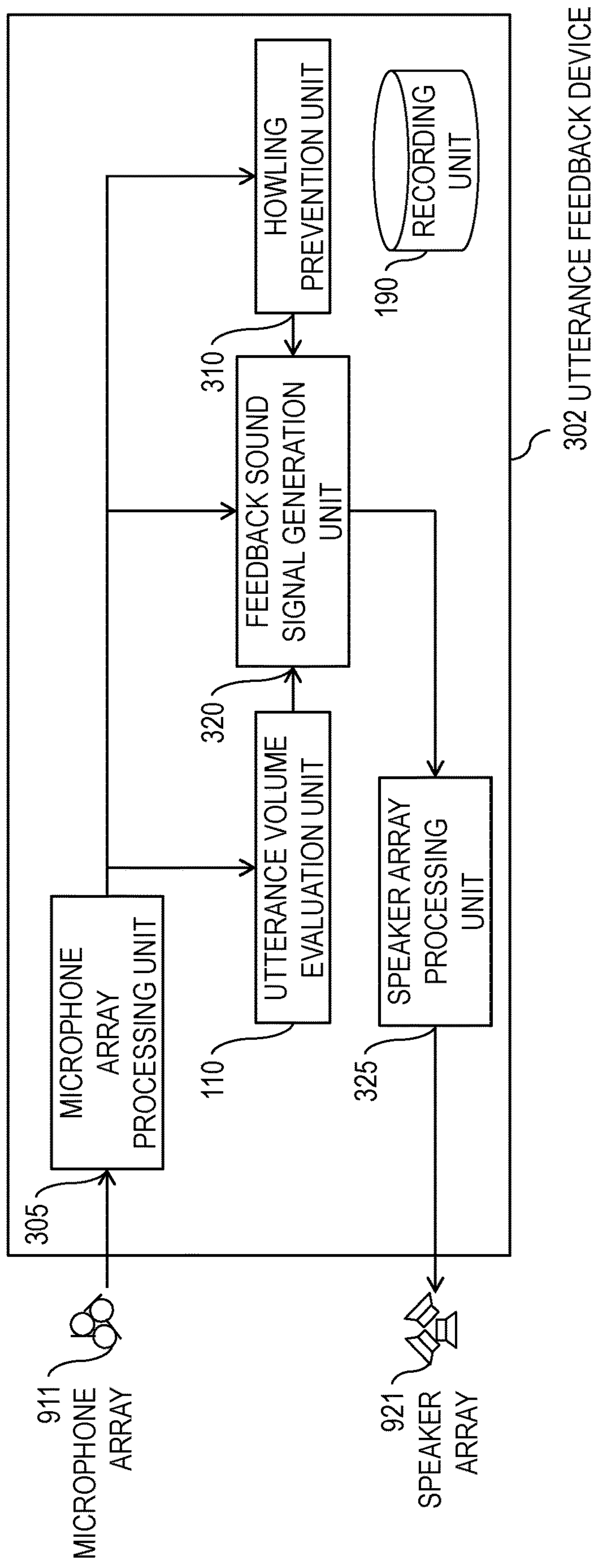
FIG. 9 is a block diagram showing a configuration of an utterance feedback device 302.
Figure 10:
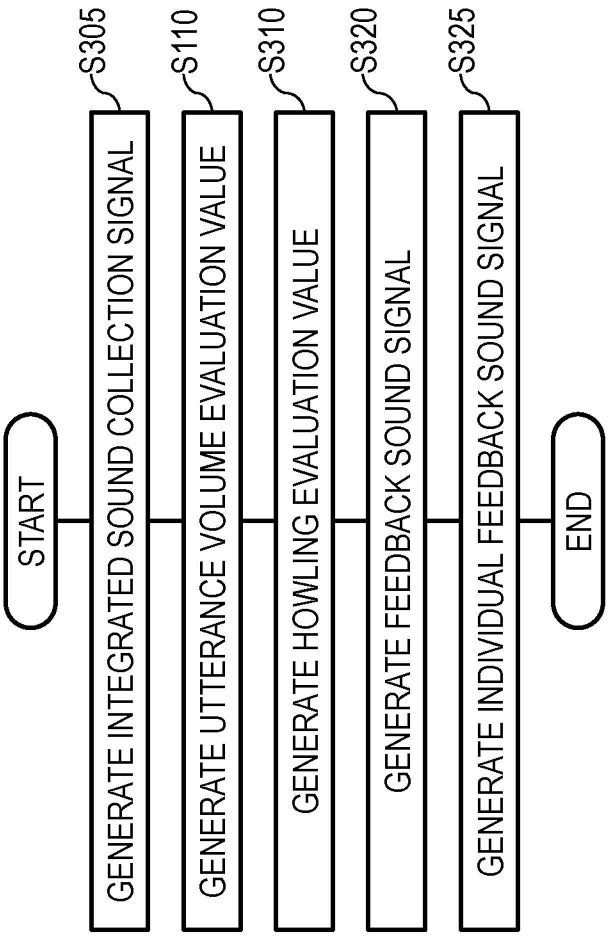
FIG. 10 is a flowchart showing an operation of the utterance feedback device 302.

An utterance feedback device 302 will be described below with reference to FIGS. 9 and 10. FIG. 9 is a block diagram showing a configuration of the utterance feedback device 302. FIG. 10 is a flowchart showing an operation of the utterance feedback device 302. As shown in FIG. 9, the utterance feedback device 302 includes a microphone array processing unit 305, the utterance volume evaluation unit 110, the howling prevention unit 310, the feedback sound signal generation unit 320, a speaker array processing unit 325, and the recording unit 190. The recording unit 190 is a component for properly recording information necessary for the processing of the utterance feedback device 302. The utterance feedback device 302 is connected to a microphone array 911 including N (N is an integer of 2 or more) microphones and a speaker array 921 including M (M is an integer of 2 or more) speakers. The microphone array 911 is installed in the vicinity of the utterer to collect the utterance voice which is the voice of the utterer. The speaker array 921 is installed to emit a feedback sound indicating the degree of the volume of the utterance voice to the utterer. The utterance feedback device 302 is different from the utterance feedback device 300 in that the utterance feedback device 302 includes the microphone array processing unit 305 and the speaker array processing unit 325 and is connected to the microphone array 911 and the speaker array 921 instead of the microphone 910 and the speaker 920.

The operation of the utterance feedback device 302 will be described with reference to FIG. 10. Here, only operations of the microphone array processing unit 305 and the speaker array processing unit 325 will be described.

In S305, the microphone array processing unit 305 receives N sound collection signals output by the N microphones included in the microphone array 911 as an input, generates an integrated sound collection signal from the N sound collection signals, and outputs the integrated sound collection signal. It is preferred that, by using predetermined signal processing, for example, the microphone array processing unit 305 form directivity in the direction of the utterer and a dead angle in the direction of the speakers included in the speaker array 921, to generate the integrated sound collection signal.

In S325, the speaker array processing unit 325 inputs the feedback sound signal generated in S320, generates, from the feedback sound signal, M individual feedback sound signals for emitting sound from a speaker included in the speaker array 921, and outputs the M individual feedback sound signals. It is preferred that, by using predetermined signal processing, for example, the speaker array processing unit 325 form directivity in the direction of the utterer and a dead angle in the direction of the microphones included in the microphone array 911, to generate the M individual feedback sound signals. The directions of the utterer and the microphones included in the microphone array 911 may be obtained by any method, and for example, the direction of the utterer can be obtained by sound source direction estimation by the microphone array processing unit 305. When information on the positions of the utterer and the microphones included in the microphone array 911 are obtained, the directions of the utterer and the microphones included in the microphone array 911 may be determined. The information on the positions of the utterer and the microphones included in the microphone array 911 may be obtained from a system (not shown) for estimating the positions from an image photographed by a camera, or when the information of the positions is obtained in advance, said information may be used.

The howling evaluation value can be generated more accurately by forming directivity by using the microphone array or the speaker array.

According to the embodiment of the present invention, it is possible to provide feedback to the utterer on the degree of the utterance volume. By preventing howling, the utterer can adjust the utterance volume more accurately and spontaneously.

Fourth Embodiment

Figure 11:
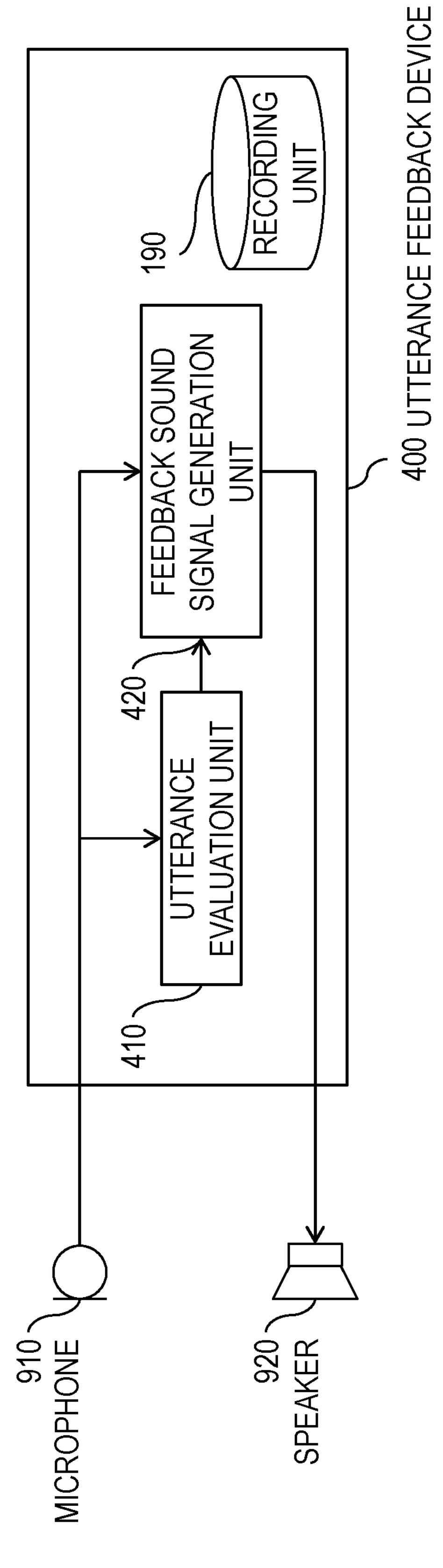
FIG. 11 is a block diagram showing a configuration of an utterance feedback device 400.
Figure 12:
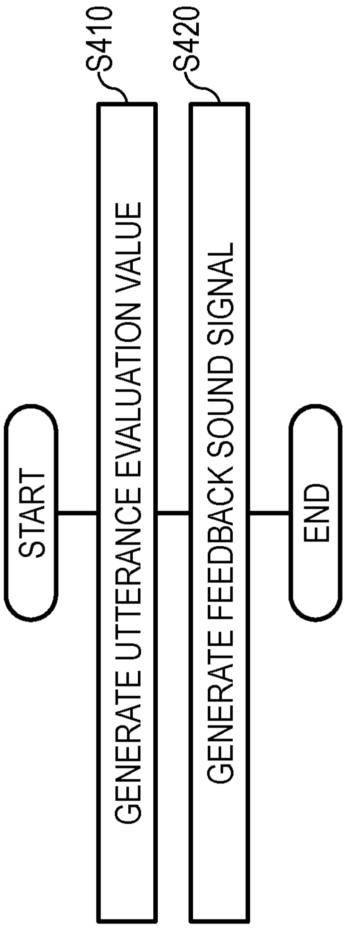
FIG. 12 is a flowchart showing an operation of the utterance feedback device 400.

An utterance feedback device 400 will be described below with reference to FIGS. 11 and 12. FIG. 11 is a block diagram showing a configuration of the utterance feedback device 400. FIG. 12 is a flowchart showing an operation of the utterance feedback device 400. As shown in FIG. 11, the utterance feedback device 400 includes an utterance evaluation unit 410, a feedback sound signal generation unit 420, and the recording unit 190. The recording unit 190 is a component for properly recording information necessary for the processing of the utterance feedback device 400. The utterance feedback device 400 is connected to the microphone 910 and the speaker 920. Note that headphones or earphones may be used in place of the speaker 920. The utterance feedback device 400 is different from the utterance feedback device 100 in that the utterance feedback device 400 includes the utterance evaluation unit 410 in place of the utterance volume evaluation unit 110 and includes the feedback sound signal generation unit 420 in place of the feedback sound signal generation unit 120.

The operation of the utterance feedback device 400 will be described with reference to FIG. 12.

In S410, the utterance evaluation unit 410 receives a sound collection signal output by the microphone 910 as an input, generates an evaluation value for the utterance voice (hereinafter referred to as an utterance evaluation value), from the sound collection signal, and outputs the evaluation value.

Figure 13:
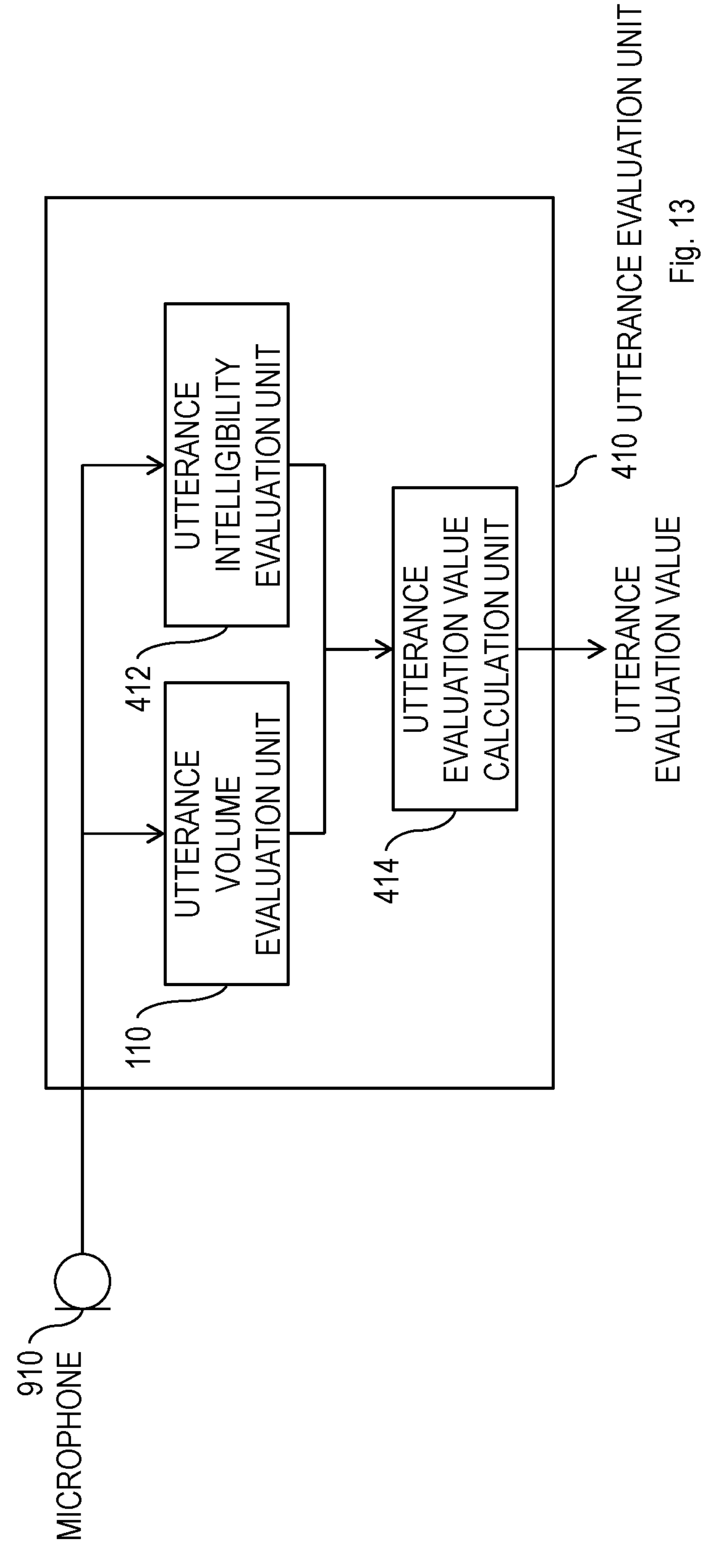
FIG. 13 is a block diagram showing a configuration of an utterance evaluation unit 410.
Figure 14:
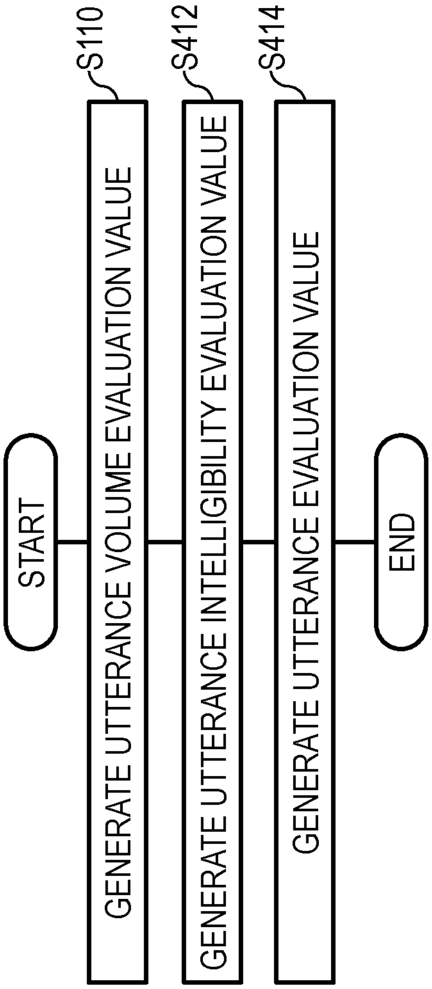
FIG. 14 is a flowchart showing an operation of the utterance evaluation unit 410.

The utterance evaluation unit 410 will be described below with reference to FIGS. 13 and 14. FIG. 13 is a block diagram showing a configuration of the utterance evaluation unit 410. FIG. 14 is a flowchart showing an operation of the utterance evaluation unit 410. As shown in FIG. 13, the utterance evaluation unit 410 includes the utterance volume evaluation unit 110, an utterance intelligibility evaluation unit 412, and an utterance evaluation value calculation unit 414.

The operation of the utterance evaluation unit 410 will be described with reference to FIG. 14.

In S110, the utterance volume evaluation unit 110 receives a sound collection signal output by the microphone 910 as an input, generates an evaluation value for the volume of the utterance voice (referred to as an utterance volume evaluation value, hereinafter) from the sound collection signal, and outputs the evaluation value.

In S412, the utterance intelligibility evaluation unit 412 receives a sound collection signal output by the microphone 910 as an input, and generates, from the sound collection signal, an evaluation value for intelligibility of the utterance voice (hereinafter referred to as an utterance intelligibility evaluation value), and outputs the utterance intelligibility evaluation value. For example, a short-time objective intelligibility (STOI) or a voice recognition score can be used as the utterance intelligibility evaluation value.

In S414, the utterance evaluation value calculation unit 414 inputs the utterance volume evaluation value generated in S110 and the utterance intelligibility evaluation value generated in S412, calculates a weighted sum of the utterance volume evaluation value and the utterance intelligibility evaluation value, and outputs the sum as the utterance evaluation value.

In S420, the feedback sound signal generation unit 420 inputs the sound collection signal output by the microphone 910 and the utterance evaluation value generated in S410, and by using a feedback gain corresponding to the utterance evaluation value, generates a signal of a feedback sound emitted from the speaker 920 (hereinafter referred to as a feedback sound signal) from the sound collection signal, and outputs the feedback sound signal.

(Modification)

The utterance feedback device may be configured to provide feedback using visual information instead of using sound. In this case, the utterance feedback device 400 includes a feedback information generation unit 421 (not shown) instead of the feedback sound signal generation unit 420. The feedback information generation unit 421 inputs the utterance evaluation value generated in S410, and generates and outputs information indicating that the volume of utterance is large, when the utterance evaluation value is larger than a predetermined threshold.

According to the embodiment of the present invention, it is possible to provide feedback to the utterance on the degree of annoyance of utterance based on the volume and intelligibility of the utterance. By using the utterance evaluation value that also considers the intelligibility of the utterance, for example, even if the volume of the utterance is low and the content of the utterance can be heard, it is possible to provide feedback even on annoying utterances that are disturbing to the surrounding people.

<Additional Note>

Figure 15:
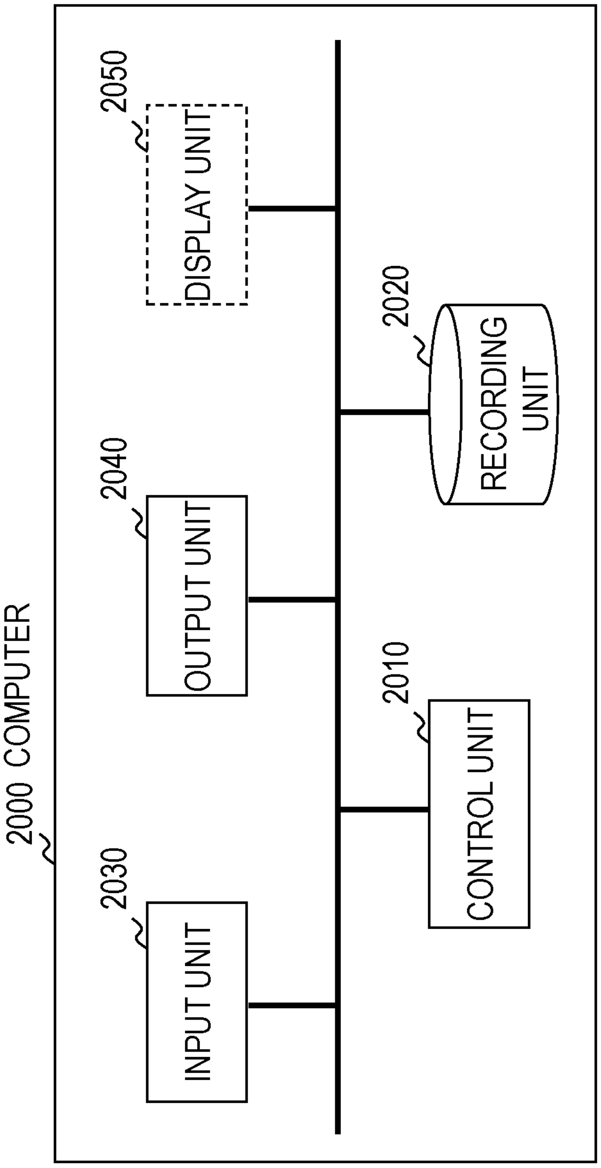
FIG. 15 is a diagram showing an example of a functional configuration of a computer that realizes each device according to an embodiment of the present invention.

FIG. 15 is a diagram showing an example of a functional configuration of a computer 2000 that realizes each of the above-described devices. The processing in each of the above-described devices can be performed by loading a program for causing the computer 2000 to function as each of the above-described devices into a recording unit 2020, and causing a control unit 2010, an input unit 2030, an output unit 2040, and the like to operate the program.

The device of the present invention includes, for example, as single hardware entities, an input unit to which a keyboard or the like can be connected, an output unit to which a liquid crystal display or the like can be connected, a communication unit to which a communication device (for example, a communication cable) capable of communication with the outside of the hardware entity can be connected, a CPU (Central Processing Unit, which may include a cache memory, a register, and the like), a RAM or a ROM that is a memory, an external storage device that is a hard disk, and a bus for connecting the input unit, the output unit, the communication unit, the CPU, the RAM, the ROM, and the external storage device so as to allow data communication therebetween. Also, if necessary, the hardware entity may be provided with a device (drive) or the like capable of reading and writing data from/to a recording medium such as a CD-ROM. Examples of a physical entity including such hardware resources include a general-purpose computer.

A programs required to implement the above-described functions, data required to process the program, and the like are stored in the external storage device of the hardware entity (the present invention is not limited to the external storage device and, for example, the program may be stored in the ROM which is a read-only storage device). Further, data or the like obtained by processing the program is appropriately stored in the RAM, the external storage device, or the like.

In the hardware entity, each program stored in the external storage device (or ROM, etc.) and data necessary for the processing of each program are read into a memory as necessary, and interpreted, executed, and processed by the CPU as appropriate. As a result, the CPU realizes predetermined functions (the constitutional units described above as units, means, etc.).

The present invention is not limited to the above-described embodiments, and appropriate changes can be made without departing from the spirit of the present invention. Further, the processes described in the embodiments are not only executed in time series in the described order, but also may be executed in parallel or individually according to a processing capability of a device that executes the processes or as necessary.

As described above, when a processing function in the hardware entity (the device according to the present invention) described in the above-described embodiments is implemented by a computer, processing content of the function to be included in the hardware entity is described by the program. By executing this program on the computer, the processing function in the above-described hardware entity is implemented on the computer.

A program describing this processing content can be recorded on a computer-readable recording medium. Examples of the computer-readable recording medium may include any recording medium such as a magnetic recording device, an optical disc, a magneto-optical recording medium, and a semiconductor memory. Specifically, for example, a hard disk device, a flexible disk, or a magnetic tape can be used as the magnetic recording device, a DVD (Digital Versatile Disc), a DVD-RAM (Random Access Memory), a CD-ROM (Compact Disc Read Only Memory), or a CD-R (Recordable)/RW (ReWritable) or the like can be used as the optical disk, an MO (Magneto-Optical disc) or the like can be used as the magneto-optical recording medium, and an EEP-ROM (Electronically Erasable and Programmable-Read Only Memory) or the like can be used as the semiconductor memory.

The program is distributed, for example, by sales, transfer, or lending of a portable recording medium such as a DVD or a CD-ROM on which the program is recorded. In addition, the distribution of the program may be performed by storing the program in advance in a storage device of a server computer and transferring the program from the server computer to another computer via a network.

The computer that executes such a program first temporarily stores, for example, the program recorded on the portable recording medium or the program transferred from the server computer, in a storage device of the computer. When the computer executes the processing, the computer reads the program stored in the storage device of the computer and executes processing according to the read program. Further, as another embodiment of the program, the computer may directly read the program from the portable recording medium and execute processing according to the program, and further, processing according to a received program may be sequentially executed each time the program is transferred from the server computer to the computer. Furthermore, instead of transferring the program to the computer from a server computer, the processing described above may be executed by a so-called ASP (Application Service Provider) type service, in which a processing function is realized by execution commands and result acquisition alone. Note that the program in the present embodiment includes information to be used for processing by an electronic computer and equivalent to the program (data which is not a direct command to the computer but has a property that regulates the processing of the computer and the like).

Further, although the hardware entity is configured by executing a predetermined program on the computer in the present embodiment, at least a part of the processing content of the hardware entity may be realized in hardware.

The above description of the embodiments of the present invention is presented for the purpose of illustration and description. There is no intention to be exhaustive and there is no intention to limit the present invention to the disclosed precise form. Modifications or variations are possible from the above-described teachings. The embodiments are selectively represented in order to provide the best illustration of the principle of the present invention and in order for those skilled in the art to be able to use the present invention in various embodiments and with various modifications so that the present invention is suitable for deliberated practical use. All of such modifications or variations are within the scope of the present invention defined by the appended claims interpreted according to a width given fairly, legally and impartially.

The invention claimed is:

1. An utterance feedback device, comprising:

at least one processor; and memory storing instruction that, when executed by the at least one processor, causes the device to perform a set of operations. the set of operations comprising:

generating an utterance voice evaluation value for a volume of an utterance voice, wherein the utterance voice evaluation value is generated ( from a first sound collection signal using a first microphone and from a second sound collection signal using a second microphone, wherein the second microphone is installed at a position farther away from the first microphone, wherein the first microphone is installed near an utterer and the second microphone is installed at a distance from the utterer; and generating a feedback sound signal for emitting a feedback sound indicating the degree of the volume of the utterance voice to the utterer, wherein the feedback sound signal is generated from the first sound collection signal, by using a feedback gain corresponding to the utterance volume evaluation value and the feedback sound is heard by the utterer.

2. The utterance feedback device according to claim 1, wherein the feedback sound signal generation circuitry sets the feedback gain to a larger value as the utterance volume evaluation value becomes a larger value.

3. The utterance feedback device according to claim 1, wherein the feedback sound signal generation circuitry generates the feedback sound signal by using a feedback gain causing distortion, when the utterance volume evaluation value exceeds a predetermined threshold.

4. The utterance feedback device according to claim 1, further comprising:

a howling prevention circuitry configured to generate a howling evaluation value indicating a possibility of an occurrence of howling, when a feedback sound is emitted from a speaker, by using the first sound collection signal, wherein the feedback sound signal generation circuitry sets the feedback gain to a smaller value as the howling evaluation value becomes a value indicating that the howling evaluation value is larger.

5. An utterance feedback method, comprising:

generating, by an utterance feedback device, an utterance voice evaluation value for a volume of an utterance voice, wherein the utterance voice evaluation value is generated from a first sound collection signal using a first microphone and from a second sound collection signal using a second microphone, wherein the second microphone is installed at a position farther away from the first microphone, wherein the first microphone is installed near an utterer and the second microphone is installed at a distance from the utterer; and generating, by the utterance feedback device, a feedback sound signal for emitting a feedback sound indicating the degree of the volume of the utterance voice to the utterer wherein the feedback sound signal is generated from the first sound collection signal, by using a feedback gain corresponding to the utterance volume evaluation value and the feedback sound is heard by the utterer.

6. A non-transitory computer-readable recording medium recording a program for enabling a computer to function as the utterance feedback device according to claim 1.

* * * * *